(12) United States Patent
Wu et al.

(10) Patent No.: US 10,586,246 B2
(45) Date of Patent: Mar. 10, 2020

(54) REPORTING MOBILE APPLICATION ACTIONS

(71) Applicant: Google LLC, Mountain View, CA (US)

(72) Inventors: Ping Wu, Saratoga, CA (US); Kai Ju Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 278 days.

(21) Appl. No.: 13/739,595

(22) Filed: Jan. 11, 2013

(65) Prior Publication Data
US 2014/0200991 A1  Jul. 17, 2014

(51) Int. Cl.
 *G06Q 30/02* (2012.01)
(52) U.S. Cl.
 CPC ......... *G06Q 30/0246* (2013.01); *G06Q 30/02* (2013.01); *G06Q 30/0242* (2013.01); *G06Q 30/0277* (2013.01)
(58) Field of Classification Search
 None
 See application file for complete search history.

(56) References Cited

U.S. PATENT DOCUMENTS

| | | | | |
|---|---|---|---|---|
| 5,608,874 | A * | 3/1997 | Ogawa et al. | 709/246 |
| 7,050,445 | B1 * | 5/2006 | Zellner et al. | 370/412 |
| 7,065,500 | B2 | 6/2006 | Singh et al. | |
| 7,844,489 | B2 | 11/2010 | Landesmann | |
| 8,321,275 | B2 | 11/2012 | Collins et al. | |
| 2001/0048735 | A1 * | 12/2001 | O'Neal | H04L 12/6418 379/88.13 |
| 2006/0277097 | A1 * | 12/2006 | Shafron | G06Q 10/02 705/14.55 |
| 2009/0049200 | A1 * | 2/2009 | Lin | G06F 16/258 709/246 |
| 2010/0094704 | A1 | 4/2010 | Subramanian et al. | |
| 2011/0071899 | A1 * | 3/2011 | Robertson et al. | 705/14.43 |

(Continued)

FOREIGN PATENT DOCUMENTS

| | | |
|---|---|---|
| CN | 102203816 | 9/2011 |
| KR | 10-2008-0074369 A | 8/2008 |

(Continued)

OTHER PUBLICATIONS

Bailey, Daniel; The Commonly Overlooked Difference in Click Attribution between Google Analytics and Google AdWords; Oct. 2, 2012 (Year: 2012).*

(Continued)

*Primary Examiner* — Sam Rafai
*Assistant Examiner* — Kyle G Robinson
(74) *Attorney, Agent, or Firm* — Foley & Lardner LLP

(57) ABSTRACT

Methods and systems for reporting mobile application conversions are provided. The methods and systems described herein enable a producer of a mobile app to facilitate the transmission of action notifications to a plurality of mobile advertising networks through the transmission of a single action notification to an action reporting system. The action reporting system, in turn, translates the action notification, into one or more distinct action notifications recognizable and executable by one or more respective advertising networks which an app producer has previously identified as recipients of action notifications.

29 Claims, 6 Drawing Sheets

(56) References Cited

U.S. PATENT DOCUMENTS

| | | | |
|---|---|---|---|
| 2011/0206197 A1* | 8/2011 | Gillin | G06Q 30/02 |
| | | | 379/221.05 |
| 2011/0276374 A1 | 11/2011 | Heiser, II et al. | |
| 2011/0302025 A1* | 12/2011 | Hsiao | G06Q 30/02 |
| | | | 705/14.42 |
| 2012/0029983 A1* | 2/2012 | Rodriguez | G06Q 30/02 |
| | | | 705/14.4 |
| 2012/0101883 A1 | 4/2012 | Akhter et al. | |
| 2012/0130801 A1 | 5/2012 | Baranov et al. | |
| 2012/0215701 A1 | 8/2012 | Mehta et al. | |
| 2012/0246202 A1* | 9/2012 | Surtani | G06F 17/30569 |
| | | | 707/812 |
| 2012/0265603 A1 | 10/2012 | Corner et al. | |
| 2012/0323664 A1 | 12/2012 | Klems | |
| 2013/0013419 A1 | 1/2013 | Sim et al. | |
| 2013/0035975 A1* | 2/2013 | Cavander | G06Q 30/02 |
| | | | 705/7.22 |
| 2013/0086595 A1* | 4/2013 | Findeisen et al. | 719/313 |
| 2013/0115911 A1* | 5/2013 | Vishwanathan | H04L 67/2804 |
| | | | 455/406 |
| 2013/0159507 A1* | 6/2013 | Mason | G06Q 10/10 |
| | | | 709/224 |
| 2013/0166376 A1* | 6/2013 | Cohen et al. | 705/14.45 |
| 2013/0290436 A1* | 10/2013 | Martin et al. | 709/206 |
| 2013/0325588 A1* | 12/2013 | Kalyanam | G06Q 30/0243 |
| | | | 705/14.42 |
| 2014/0172688 A1* | 6/2014 | Korten et al. | 705/39 |

FOREIGN PATENT DOCUMENTS

| | | |
|---|---|---|
| KR | 10-0983240 B1 | 9/2010 |
| KR | 10-2012-0132023 A | 12/2012 |

OTHER PUBLICATIONS

PCT/US2013/078060 International Search Report and Written Opinion dated Apr. 24, 2014, (11 pages).

U.S. Appl. No. 13/404,501, filed Feb. 24, 2012 entitled "Determining Application Conversions," to James Kent et al.

Extended European Search Report for EP 13870803.7, dated Jun. 17, 2016, 7 pages.

First Office Action issued in CN Application No. 201380073450.7, dated Jul. 2, 2018.

\* cited by examiner

REPORTING MOBILE APPLICATION ACTIONS

BACKGROUND

The present disclosure relates to applications for use on mobile communication devices, and, more particularly, to reporting actions taken by users of mobile communication devices that involve the acquisition and/or use of mobile applications ("mobile apps").

The rapidly growing capabilities of mobile communication devices (e.g., "smartphones") and their supporting networks present significant opportunities for the distribution and presentation of various forms of content. One such form of content is referred to collectively as mobile applications ("mobile apps"), which are essentially software applications that enable a user of a mobile communication device to perform various functions, ranging from entertainment (such as games and media players) to more practical functions (such as mobile banking).

Users of mobile communication devices acquire mobile apps from a variety of sources such as through presentations of offers for mobile apps that are featured in other mobile apps. That is, a user may be actively using a particular mobile app and be presented with an offer for another mobile app. Such presentations for offers for mobile apps are presented by one or more presentation networks that work in association with the mobile communication networks that support mobile communication devices. In some cases, presentations of offers for the same mobile app may be presented by more than one presentation network to the same mobile communication device.

When a user, using a first mobile app, is presented with an offer for a second mobile app, and then at some point in time acquires the second mobile app, or takes some other similar qualifying action, such as supplying contact information ("registration"), a "conversion" is said to have taken place, if the action can be tied to a click on an item of online or mobile content. As used herein, a "qualifying action" (also referred to herein generally as an "action") is a download of an app, a user registration, or other user activity other than the user clicking on an item of online or mobile content, simply to view it. Accordingly, a qualifying action may rise to the level of a conversion, when the action is tied to a click on an item of online content. It is of interest to both the producers of mobile apps, as well as the presentation networks that present them, to record and report qualifying actions generally, and conversions specifically, with respect to which apps on which actions were taken, and through which presentation networks conversions occurred.

In order to facilitate the recording and reporting of qualifying actions and conversions, a producer of a mobile app typically is required to embed one or more code snippets (also referred to as "action software development kits" or "action SDKs") within the app. The one or more code snippets cause an action notification (or "action request message") to be transmitted to the presentation network through which the user was presented with, and/or took action regarding, the particular mobile app. However, as previously described, a particular app may be presented by several different presentation networks. Accordingly, a producer of an app must embed several separate code snippets within the app in order to enable action reporting to each of the presentation networks presenting that app.

As a result, producers of apps are required to create apps having increased file size to accommodate the code snippets or action SDKs for each of the presentation networks managing offer presentations of these apps. Furthermore, should an app producer wish to add or delete a presentation network from those presentation networks designated to receive action notifications, the process of doing so is cumbersome and time-consuming. In addition, in order to review the recorded and reported action information, app producers must log into each presentation network that presents their apps of interest.

BRIEF DESCRIPTION OF THE DISCLOSURE

In one aspect, a computer-implemented method is provided for reporting actions on computer-executable applications advertised by a first mobile advertising network, the method implemented using a first computing device coupled to a memory device. The method includes receiving, at the first computing device, an indication that a first mobile advertising network is advertising a promoted application on a second computing device. The method further includes receiving, at the first computing device, an action notification indicating that the promoted application has been downloaded by the second computing device, wherein the action notification is in a first format. The method further includes storing, in the memory device, rules for translating the action notification from the first format to a second format, wherein the second format is associated with the first mobile advertising network. The method further includes translating, by the first computing device, the action notification from the first format to the second format. The method further includes transmitting the action notification in the second format from the first computing device to the first mobile advertising network.

In another aspect, computer-readable storage media having computer-executable instructions embodied thereon are provided. When executed by at least one processor, the computer-executable instructions cause the processor to receive an indication that a first mobile advertising network is advertising a promoted application on a second computing device. The computer-executable instructions further cause the processor to receive an action notification indicating that the promoted application has been downloaded by the second computing device, wherein the action notification is in a first format. The computer-executable instructions further cause the processor to store rules for translating the action notification from the first format to a second format, wherein the second format is associated with the first mobile advertising network. The computer-executable instructions further cause the processor to translate the action notification from the first format to the second format. The computer-executable instructions further cause the processor to transmit the action notification in the second format to the first mobile advertising network.

In another aspect, a computer system is provided. The computer system includes a first computing device that includes a processor and a computer-readable storage device having encoded thereon computer-readable instructions that are executable by the processor. The computer-readable instructions cause the processor to receive an indication that a first mobile advertising network is advertising a promoted application on a second computing device. The computer-executable instructions further cause the processor to receive an action notification indicating that the promoted application has been downloaded by the second computing device, wherein the action notification is in a first format. The computer-executable instructions further cause the processor to store rules for translating the action notification from the first format to a second format, wherein the second format is associated with the first mobile advertising network. The computer-executable instructions further cause the processor to translate the action notification from the first format to a second format. The computer-executable instructions further cause the processor to transmit the action notification in the second format to the first mobile advertising network.

The features, functions, and advantages described herein may be achieved independently in various embodiments of the present disclosure or may be combined in yet other embodiments, further details of which may be seen with reference to the following description and drawings.

Figure 1:
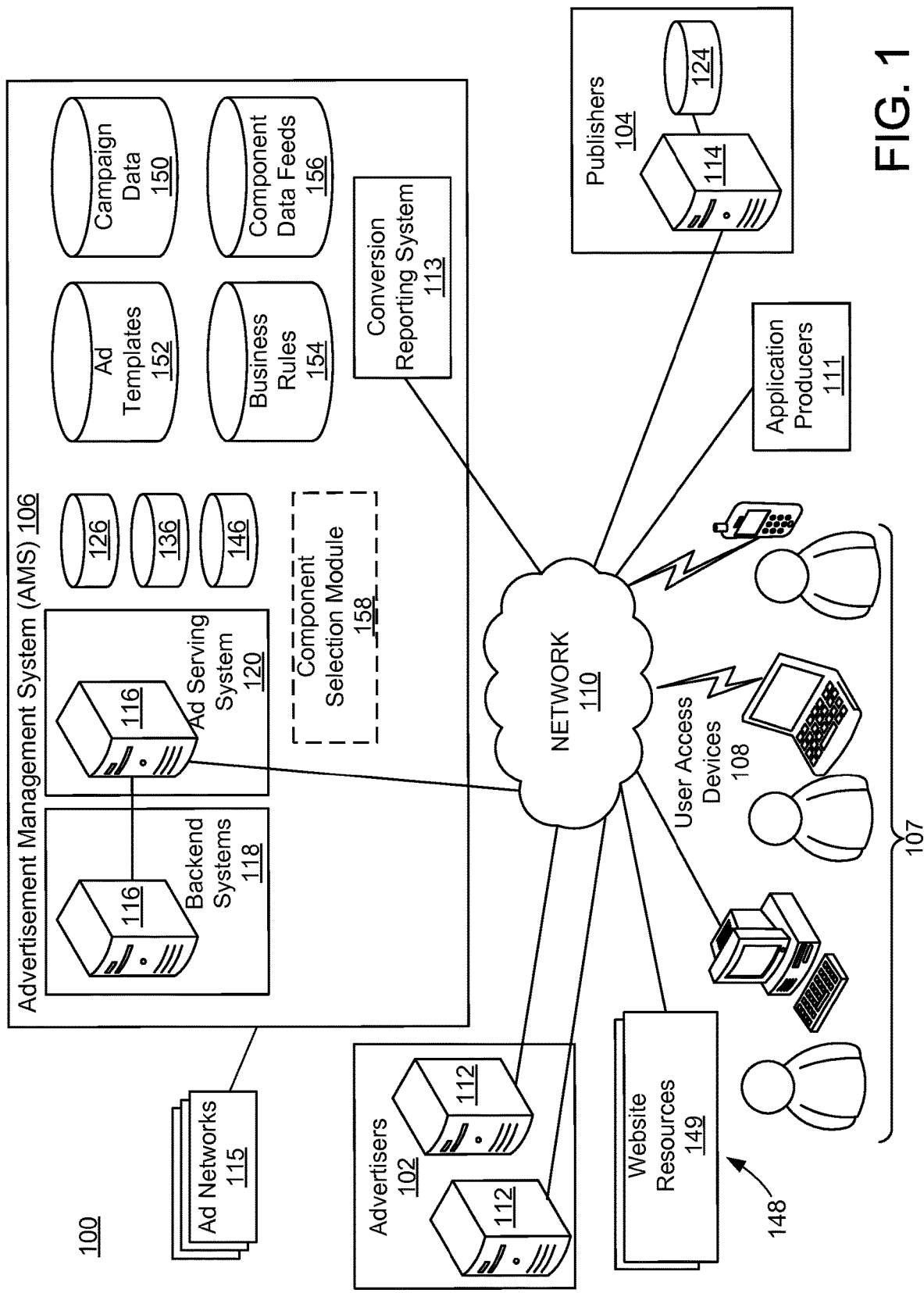
FIG. 1 is a block diagram depicting an example advertising environment, which includes advertisement and serving of mobile applications.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of various implementations refers to the accompanying drawings. The same reference numbers in different drawings may identify the same or similar elements. Also, the following detailed description of various implementations does not limit the disclosure.

As used herein, an element or step recited in the singular and proceeded with the word "a" or "an" should be understood as not excluding plural elements or steps, unless such exclusion is explicitly recited. Furthermore, references to "one embodiment" of the subject matter described herein are not intended to be interpreted as excluding the existence of additional embodiments that also incorporate the recited features.

The subject matter described herein relates generally to the advertisement of mobile apps, particularly within other mobile apps. Specifically, the methods and systems described herein enable the recording and reporting of actions on those apps to the advertising networks (also referred to as "presentation networks") that present them through such advertisements. As described above, known methods for reporting and recording actions on mobile apps require app producers to include in their apps code snippets or SDKs for each of the mobile advertising networks through which their apps are advertised. It would be desirable to provide a method for reporting and recording actions for mobile applications that streamlines the process of both recording and reporting actions to mobile advertising networks and simplifies the process of producing apps as well as simplifying the effort required for app producers to review action information.

The methods and systems described herein may be implemented using computer programming or engineering techniques including computer software, firmware, hardware or any combination or subset thereof, wherein the technical effects may be achieved by performing at least one of the following steps: a) receiving, at the first computing device, an indication that a first mobile advertising network is advertising a promoted application on a second computing device; b) receiving, at the first computing device, an action notification indicating that the promoted application has been downloaded by the second computing device, wherein the action notification is in a first format; c) storing, in the memory device, rules for translating the action notification from the first format to a second format, wherein the second format is associated with the first mobile advertising network; d) translating, by the first computing device, the action notification from the first format to the second format; e) transmitting the action notification in the second format from the first computing device to the first mobile advertising network; f) presenting a user interface enabling a producer of the promoted application to indicate that the first mobile advertising network is advertising the promoted application; g) storing in the memory device an action profile associated with the first advertising network, wherein the action profile includes one or more specifications for mapping elements of the action notification from the first format to the second format; h) receiving, at the first computing device, an indication that a second mobile advertising network is advertising the promoted application; i) storing, in the memory device, rules for translating the action notification from the first format to a third format, wherein the third format is associated with the second mobile advertising network; j) translating, by the first computing device, the action notification from the first format to the third format; k) transmitting the action notification in the third format from the first computing device to the second mobile advertising network; l) transmitting, from the first computing device, to a third computing device associated with the producer of the promoted application, a code snippet for inclusion in the promoted application, wherein the code snippet, when executed, causes the second computing device to transmit the action notification in the first format to the first computing device; m) receiving, at the first computing device, an enable indication, wherein the enable indication indicates that the first computing device has authorization to transmit the action notification to the first mobile advertising network; n) receiving, by the first computing device, the action notification from a server computing device associated with the producer of the promoted application; and o) applying additional information, such as click data, which may include device identifier information, to determine whether an action, such as a download of a promoted app, qualifies as a conversion.

The following description refers to the accompanying drawings, in which, in the absence of a contrary representation, the same numbers in different drawings represent similar elements.

With reference to FIG. 1, an example advertising environment 100 may include one or more advertisers 102, one or more publishers 104, an advertisement management system (AMS) 106, one or more user access devices 108, such as mobile communication devices, employed by users 107, which may be coupled to a network 110. In an example embodiment, network 110 is a mobile communication network. Specifically, user access devices 108 represent various forms of mobile communication devices, such as personal digital assistants, cellular telephones, smart phones, and other similar portable access devices. Also coupled to network 110 are one or more mobile application producers ("app producers") 111, and an action reporting system 113.

AMS 106 may include one or more data processing systems 116, such as servers or embedded systems, coupled to the network 110. It can also include one or more processes, such as server processes. In some examples, AMS 106 may include an ad serving system 120 and one or more backend processing systems 118. The ad serving system 120 may include one or more data processing systems 116 and may perform functionality associated with delivering ads to publishers or user access devices. The backend processing systems 118 may include one or more data processing systems 116 may perform functionality associated with identifying relevant ads to deliver, processing various rules, performing filtering processes, generating reports, maintaining accounts and usage information, and other backend system processing. AMS 106 can use backend processing systems 118 and ad serving system 120 to selectively recommend and provide relevant ads from app producers 111 to the user access devices 108.

Ad serving system 120 and/or one or more backend processing system 118 may also be referred to herein collectively as "the first computing device." User access devices 108, particularly mobile communication devices 108 may also be referred to herein as "the second computing device." App producers 111 have associated with them one or more computing devices that may also be referred to herein as "third computing devices."

In an example embodiment, action reporting system 113 is maintained and operated as part of AMS 106. In another embodiment, action reporting system 113 is maintained and operated separately from AMS 106. Each of the elements 102, 104, 106, 108, 110 and 113 in FIG. 1 may be implemented or associated with hardware components, software components, or firmware components or any combination of such components. The elements 102, 104, 106, 108, 110 and 113 can, for example, be implemented or associated with general purpose servers, software processes and engines, and/or various embedded systems. While reference is made to distributing advertisements, the environment 100 can be suitable for distributing other forms of content including other forms of sponsored content.

The user access devices 108 may include any devices capable of receiving information from the network 110. The user access devices 108 could include general computing components and/or embedded systems optimized with specific components for performing specific tasks. Examples of user access devices include mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The advertisers 102 may include any entities that are associated with advertisements ("ads"). An advertisement or an "ad" refers to any form of communication in which one or more products, services, ideas, messages, people, organizations or other items are identified and presented (or otherwise communicated). Ads are not limited to commercial promotions or other communications. An ad may be a public service announcement or any other type of notice, such as a public notice published in printed or electronic press or a broadcast. An ad may be referred to or include sponsored content. An example of an ad is an offer for a mobile application, presented within another mobile application. Alternatively, the offer for a mobile application may be presented on an app producer's website, or a third party's website.

Ads may be communicated via various mediums and in various forms. In an example, ads are communicated through mobile communication networks, for example, as ads embedded within mobile apps accessed through mobile communication networks. In other examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The advertisers 102 may provide (or be otherwise associated with) products and/or services related to ads. In an example, advertisers 102 may include app producers 111 that create mobile apps associated with ads appearing within other mobile apps. In other examples, the advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain, measure, and/or analyze ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems. One or more ad networks 115 are functionally connected to network 110, for example, through AMS 106, for communicating advertisements to user access devices 108 (such as smartphones).

The publishers 104 may include any entities that generate, maintain, provide, present and/or otherwise process content in the environment 100. The term "content" refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with ads that are related or relevant to the retrieved content for display to users. As discussed further below, these relevant ads may be provided from the AMS 106 and be combined with content for display to users. In some examples, the publishers 104 may retrieve content for display on a particular user access device 108 and then forward the content to the user access device 108 along with code that causes one or more ads from the AMS 106 to be displayed to the user. In other examples, the publishers 104 may retrieve content, retrieve one or more relevant ads (e.g., from the AMS 106 or the advertisers 102), and then integrate the ads and the article to form a content page for display to the user. As noted above, one or more of the publishers 104 may represent a content network. In such an implementation, the advertisers 102 may be able to present ads to users through this content network. In other examples, ads from advertisers 102 may be presented to user access devices 108 (such as mobile communication devices), within apps downloaded to user access devices 108 from app producers 111.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to app producers 111, advertisers 102, publishers 104, and user access devices 108. AMS 106 may store ads in ad repository 136, and conversion data regarding actions in repository 126, and facilitate the distribution or selective provision and recommendation of ads through the environment 100 to the user access devices 108. In some configurations, AMS 106 may include or access functionality associated with an advertising serving system.

The AMS 106 may include one or more interface or frontend modules for providing the various features to app producers 111, advertisers 102, publishers 104, and user access devices 108. For example, AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AMS 106 provides various advertising management features to the advertisers 102. The AMS 106 advertising features may allow users to set up user accounts, set account preferences, create ads, select keywords for ads, create campaigns or initiatives for multiple products or businesses, view reports associated with accounts, analyze costs and return on investment, selectively identify consumers in different regions, selectively recommend and provide ads to particular publishers, analyze financial information, analyze ad performance, estimate ad traffic, access keyword tools, add graphics and animations to ads, etc.

The AMS 106 may allow the advertisers 102 to create ads and input keywords for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 126.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. The AMS 106 may deliver ads (associated with the advertisers 102) to the user access devices 108 when users access content from the publishers 104. The AMS 106 can be configured to deliver ads that are relevant to publisher sites, site content and publisher audiences.

In some examples, the AMS 106 may crawl content provided by the publishers 104 and deliver ads that are relevant to publisher sites, site content and publisher audiences based on the crawled content. The AMS 106 may also selectively recommend and/or provide ads based on user device information and user device usage, such as particular search queries performed on a search engine website, etc. The AMS 106 may store user device information in a general database 146. In some examples, the AMS 106 can add search services (e.g., a search box) to a publisher site and deliver ads configured to provide appropriate and relevant content relative to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 136 and select certain ads for display with their content.

The AMS 106 may be configured to selectively recommend and provide ads created by the advertisers 102 to the user access devices 108 directly or through the publishers 104. The AMS 106 may selectively recommend and provide ads to a particular publisher 104 (as described in further detail herein) or a requesting user access device 108 when a user requests search results or loads content from the publisher 104.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

Environment 100 further includes a website 148 including one or more resources 149 (e.g., text, images, multimedia content, and programming elements, such as scripts) associated with a domain name and hosted by one or more servers. Resources 149 can be relatively static (e.g., as in a publisher's webpage) or dynamically generated in response to user query (e.g., as in a search engine's result page).

User access devices 108, such as mobile communication devices 108, can request resources 149 from a website 148, such as those resources associated with opening and running a mobile app. In turn, build data representing the resource 149 can be provided to the user access device 108 for presentation by the user access device 108. The build data representing the resource 149 can also include data specifying an ad slot in which advertisements can be presented.

When a resource 149 is requested by a user access device 108, the advertisement management system 106 receives a request for advertisements to be provided with the resource 149. The request for advertisements can include characteristics of the advertisement slots (e.g., size, web address of the resource, media type of the requested advertisement, etc.) that are defined for the requested resource or search results page, and can be provided to the advertisement management system 106.

Based on data included in the request for advertisements, the advertisement management system 106 can identify advertisements that are eligible to be provided in response to the request. For example, eligible advertisements can have characteristics matching the characteristics of available advertisement slots and have ad serving keywords that match the specified resource keywords or search queries.

Each advertiser 102 can create one or more advertising campaigns using various campaign parameters that are used to control distribution of the advertiser's advertisements. The campaign data can be stored in the campaign data store 150. The advertisement management system 106 can retrieve the information in the campaign data store 150 when preparing a response to an ad request.

The advertisers can specify multiple dynamic ad creatives or ad templates for use in the advertiser's ad campaigns. The ad templates can be stored along with other creatives (e.g., static image ads, video ads, text ads, etc.) in the campaign data store 150. In some implementations, the ad templates can be stored separately from the other types of creatives, for example, in an ad template data store 152. Individual ad templates can be retrieved by the advertisement management system 106 by the templates' creative IDs.

The advertisement management system 106 can have access to a large number of available components of various types, for example, through a component data feed store 156. The components can have varying content. The component data feed store 156 can be provided and updated by the advertiser from time to time. In some implementations, the component data feed store 156 can be linked to the advertiser's product catalogs or other business data stores, such that real-time data can be made available to the advertisement management system 106 without active intervention by the advertiser.

The advertisement management system 106 can select components from among the large number of components available in the component data feed store 156. The advertisement management system 106 can also apply the selected components to the component slots in a dynamic ad according to the specifications in an ad template selected from the ad template data store 152. Once the dynamic ad is constructed using the selected components, the dynamic ad can be provided by an advertisement management system to fulfill the received ad request. In some implementations, a component selection module 158 can be implemented to carry out actions related to component selection. The component selection module 158 can be part of the advertisement management system 106 or a standalone module in communication with the advertisement management system 106.

When the advertisement management system 106 selects components for the selected ad template in response to a received ad request, the advertisement management system 106 observes the business rules including the co-occurrence constraints specified for the selected ad template. The business rules can be specified by the advertiser through an interface provided by the advertisement management system 106. The business rules can be stored in the campaign data store along with other campaign data. Alternatively, the business rules can be stored in a business rule data store 154 apart from other types of campaign data. The business rules can be campaign specific, ad group specific, or ad template specific, for example.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Figure 2:
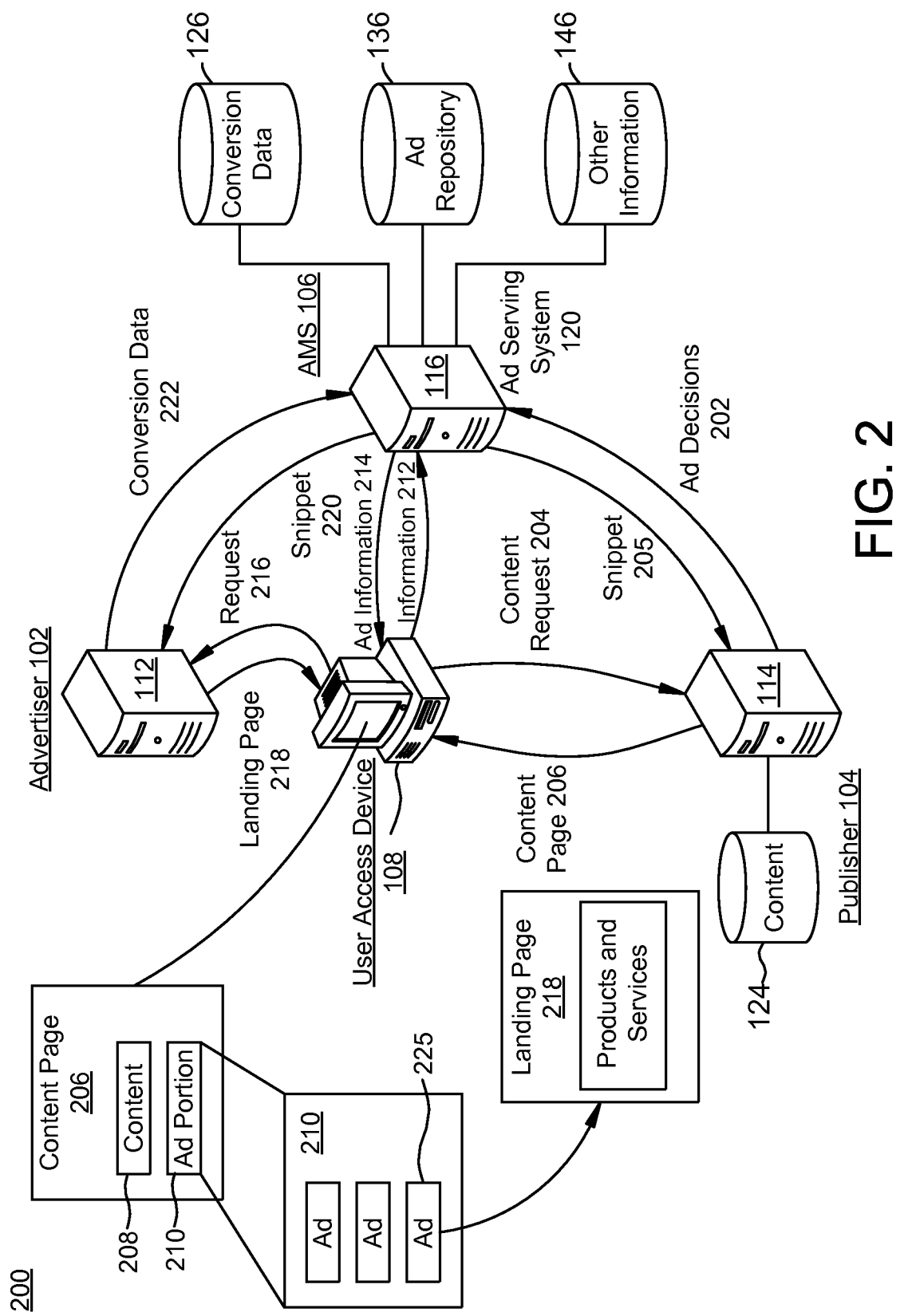
FIG. 2 is a diagram of an example advertising serving system shown in FIG. 1.

FIG. 2 illustrates an example data flow 200 within the environment 100. The data flow 200 is an example only and not intended to be restrictive. Other data flows may therefore occur in the environment 100 and, even with the data flow 200, the illustrated events and their particular order in time may vary.

In data flow 200, mobile ad networks 115 (shown in FIG. 1), through AMS 106, present ads embedded within mobile apps to user access devices (mobile communication devices) 108. Specifically, when a user 107 opens and runs a mobile app, a message is sent to one or more ad networks 115 that a particular app has been opened. An app producer 111 associated with the particular app will have provided to the one or more ad networks an ad to be presented to a user 107 while that user is using the particular app.

Also in the data flow 200, the AMS 106 stores ads from the advertisers 102 and receives ad decisions 202 from a particular publisher 104. The ad decisions 202 can include decisions to approve and/or disapprove certain ads and/or advertisers. These ad decisions can be based on aggregated ratings or scores, associated with ads/advertisers that are provided to the publisher 104 by the AMS 106. Such aggregated scores can represent ratings of ads/advertisers received from multiple publishers 104.

During the data flow 200, the publisher 104 may receive a content request 204 from a particular user access device 108. The content request 204 may, for example, include a request for a web document on a given topic (e.g., automobiles). In response to the content request 204, the publisher 104 may retrieve relevant content (e.g., an automobile article) from the content repository 124 or some other source. In other examples, content request 204 may be included as part of a mobile app downloaded from an app producer 111 to a user access device 108 (in the form of a mobile communication device 108).

The publisher 104 may respond to the content request 204 by sending a content page 206 or other presentation to the requesting user access device 108. The content page 206 may include the requested content 208 (e.g., the automobile article) as well as a code "snippet" 205 associated with an ad. A code "snippet" refers, for example, to a method used by one device (e.g., a server) to ask another device (e.g., a browser running on a client device) to perform actions after or while downloading information. In some examples, a code "snippet" may be implemented in JAVASCRIPT® code or may be part of HTML (Hypertext Markup Language) or other web page markup language or content.

The AMS 106 may provide the code snippet 205 to the publisher 104 and/or the user access device 108. The code snippet can originate and/or be provided from other sources. As the requesting user access device 108 loads the content page 206, the code snippet 205 causes the user access device 108 to contact the AMS 106 and receive additional code (e.g., JAVASCRIPT® or the like), which causes the content page 206 to load with an ad portion 210.

The ad portion 210 may include any element that allows information to be embedded within the content page 206. In some examples, the ad portion 210 may be implemented as an HTML element, such an I-Frame (inline frame) or other type of frame. The ad portion 210 may be hosted by the AMS 106 or the publisher 104 and may allow content (e.g., ads) from the AMS 106 or the publisher 104 to be embedded inside the content page 206. Parameters associated with the ad portion 210 (e.g., its size and shape) can be specified in the content page 206 (e.g., in HTML), so that the user access device 108 can present the content page 206 while the ad portion 210 is being loaded. Other implementations of ad portion 210 may also be used.

The ad portion 210 may send the AMS 106 formatting and content information 212. This information 212 may include information describing the manner (e.g., how, when, and/or where) in which ads can be rendered by the user access devices 108. The information 212 may also include ad attributes and parameters, such as size, shape, color, font, presentation style (e.g., audio, video, graphical, textual, etc.), etc. The information 212 may also specify a quantity of ads desired.

The formatting and content information 212 can include information associated with the requested content 208 displayed in content page 206. Such information may include a URL associated with the requested content page 206. The information 212 can include the requested content itself, a category corresponding to the requested content or the content request, part or all of the content request 204, content age, content type (e.g., text, graphics, video, audio, mixed media, etc.), geo-location information, and the like.

In response to the information 212, the AMS 106 may provide the user access device 108 with ad information 214. The ad information 214 may include one or more ads 225 for placement in the ad portion 210 of the content page 206. The ad information 214 may also include a signed or encoded specification of an ad.

The ad information 214 may include ads that are relevant to user interest. The AMS 106 may retrieve and provide relevant ads based on the information 212 received from the user access device 108. The AMS 106 may retrieve the ad information 214 from the ad repository 136 using the backend processing systems 118. The AMS 106 may retrieve relevant ads using information from a crawling module, various keywords, various statistical associations between ads and content, and/or preference information associated with the publishers.

The AMS 106 may decide whether to serve certain ads with publisher content based on the ad decision 202 received from the publisher 104. For example, the AMS 106 may identify a relevant ad from the ad repository 136 based on keywords but may decide that the ad should not be served with the publisher content (e.g., the requested automobile document) because the publisher 104 has indicated in the ad decisions 202 a disapproval of the identified ad. In some examples, these ad serving decisions may be based on rules maintained by the backend processing systems 118.

The ad portion 210 may populate with ads included in the ad information 214, such as ads 225. The ad portion 210 and the displayed ads 225 may occupy a portion of the content page 206, which may be distinct from other content (e.g., the requested content 208) in the content page 206.

When a user clicks on the displayed ad 225, an embedded code snippet may direct the user access device 108 to contact the AMS 106. During this event, the user access device 108 may receive an information parcel, such as a signed browser cookie, from the AMS 106. This information parcel can include information, such as an identifier of the selected ad 225, an identifier of the publisher 104, and the date/time the ad 225 was selected by the user. The information parcel may facilitate processing of conversion activities or other user transactions.

The user access device 108 may then be redirected to the advertiser 102 associated with the selected ad 225. The user access device 108 may send a request 216 to the associated advertiser 102 and then load a landing page 218 from the advertiser 102. The user may then perform a conversion action at the landing page 218, such as purchasing a product or service, purchasing or downloading a new app, registering, joining a mailing list, etc. A code snippet 220, which may be provided by the AMS 106, may be included within a conversion confirmation page script, such as a script within a web page presented after the purchase. The user access device 108 may execute the code snippet 220, which may then contact the AMS 106 and report conversion data 222 to the AMS 106. The conversion data 222 may include conversion types and numbers as well as information from cookies. The conversion data 222 may be maintained in the conversion data repository 126.

FIG. 2 is an example only and not intended to be restrictive. Other data flows may therefore occur in the environment 100 and, even with the data flow 200, the illustrated events and their particular order in time may vary. Further, the illustrated events may overlap and/or may exist in fewer steps. Moreover, certain events may not be present and additional and/or different events may be included.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
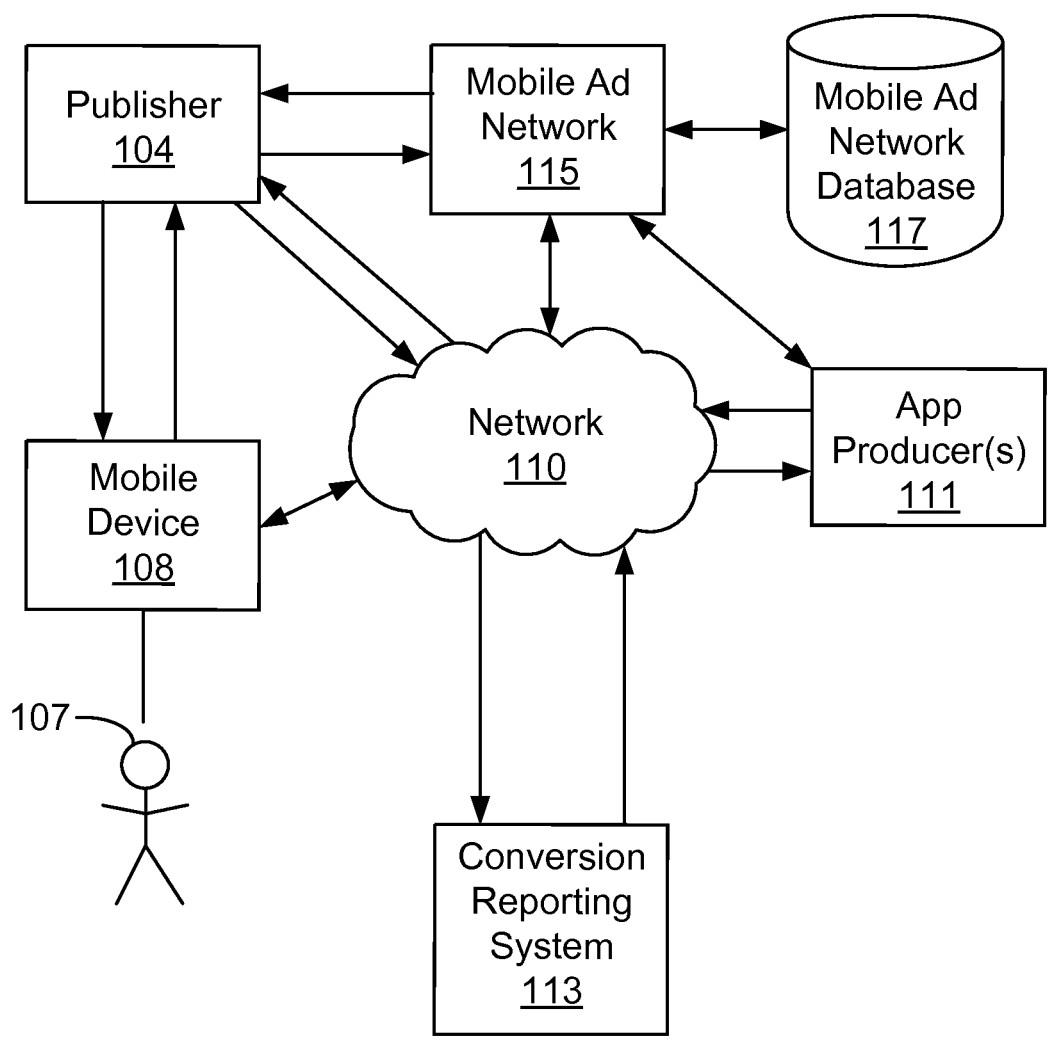
FIG. 3 is a simplified block diagram depicting an example advertising environment specific to the advertisement and serving of mobile applications.

FIG. 3 illustrates, in a simplified form, environment 100 (shown in FIG. 1) in which an ad is delivered to a mobile communication device 108. Elements having functions similar to elements illustrated in FIG. 1 are provided with similar reference numerals. A user of a mobile communication device 108 (user access device) 108 may desire to access content associated with a publisher 104, such as a mobile web server, or a mobile app store, through mobile communication network 110. When mobile communication device 108 requests content (such as a mobile app) from publisher 104, publisher 104 in response provides the requested content, which is then provided to mobile devices 108 along with one or more ads. The ads may be related to the requested content and/or specifically selected and presented to mobile communication device 108 or to the user of mobile communication device 108. In an example, the ad or ads may be embedded within the requested content. Specifically, the ad may be for another mobile app, which is presented to a user while the user is accessing the downloaded content (such as an app already installed on mobile communication device 108). As used herein, a "promoted app" is an app that is displayed or advertised within an existing app, or within other content, such as online content. As used herein, an "existing app" is an app that has already been promoted by an app producer 111, has already been downloaded and is in use by one or more users. Furthermore, an existing app is an app in which promoted apps will be displayed, or in which ads appear for promoted apps. Promoted apps may appear within other existing apps produced by the same app producer 111. Alternatively, promoted apps produced by a first app producer 111 may appear in an existing app produced by a second app producer 111. Wireless application protocol (WAP) or any other appropriate method is employed for communication between mobile communication device 108 and publisher 104. Action reporting system 113 is also in communication, e.g., via network 110, with mobile communication device 108, publisher(s) 104, app producer(s) 111, and ad network(s) 115.

As described herein, an app producer 111 may engage with several mobile ad networks 115 to promote the same promoted app. Accordingly, in the example illustrated in FIG. 3, the same ad may be presented to a specific user 107 through a mobile communication device 108 several times, by being embedded within or accompanying different content (such as other apps) provided by different mobile ad networks 115. A user may "click" on each of those ads, at different times, but may take an action that qualifies as a conversion, with respect to one of those ads, or none of the ads. For example, a user 107 may download a promoted app, using the mobile communication device 108, directly from an online app store. As used herein, an event that qualifies as a conversion event is an app opening or download, that can be referenced back to a click on an ad (such as through establishment of a time line as described herein). An otherwise-qualifying action that occurs through a user 107 directly downloading an app from an online store may, in one embodiment, still be considered as a conversion event, if such qualifying action occurs within a predefined period of time following a click by a user on a mobile ad directed to the downloaded promoted app. In an alternative embodiment, system 113, if provided with, or having access to, user device information (such as device identifiers) and click information (specifically, clicks recorded as having occurred through mobile communication device 108), as described herein, may discriminate between online qualifying actions, and true "mobile" conversions occurring as a result of a download of a promoted app from an ad shown within an existing app, and only transmit action notifications arising from true "mobile" conversions.

As depicted in the example of FIG. 3, one or more ads may be received by publisher 104 from a mobile ad network 115 in response to a request by publisher 104 for one or more ads. Mobile ad network(s) 115 provide ad provisioning services to publishers of ads on behalf of advertisers (such as app producers 111). Mobile ad network database 117 includes ads available at mobile ad network 115 for distribution to publishers, including ads directed to apps provided by app producers 111, such as promoted apps. In some embodiments, information relating to mobile communication device 108, the use of mobile communication device 108, and/or the content requested by mobile communication device 108 may be provided by publisher 104 to mobile ad network(s) 115 when requesting one or more ads to enable informed selection and serving of ads by mobile ad network(s) 115 to publisher 104 for delivery to mobile communication device 108 with the requested content.

Figure 4:
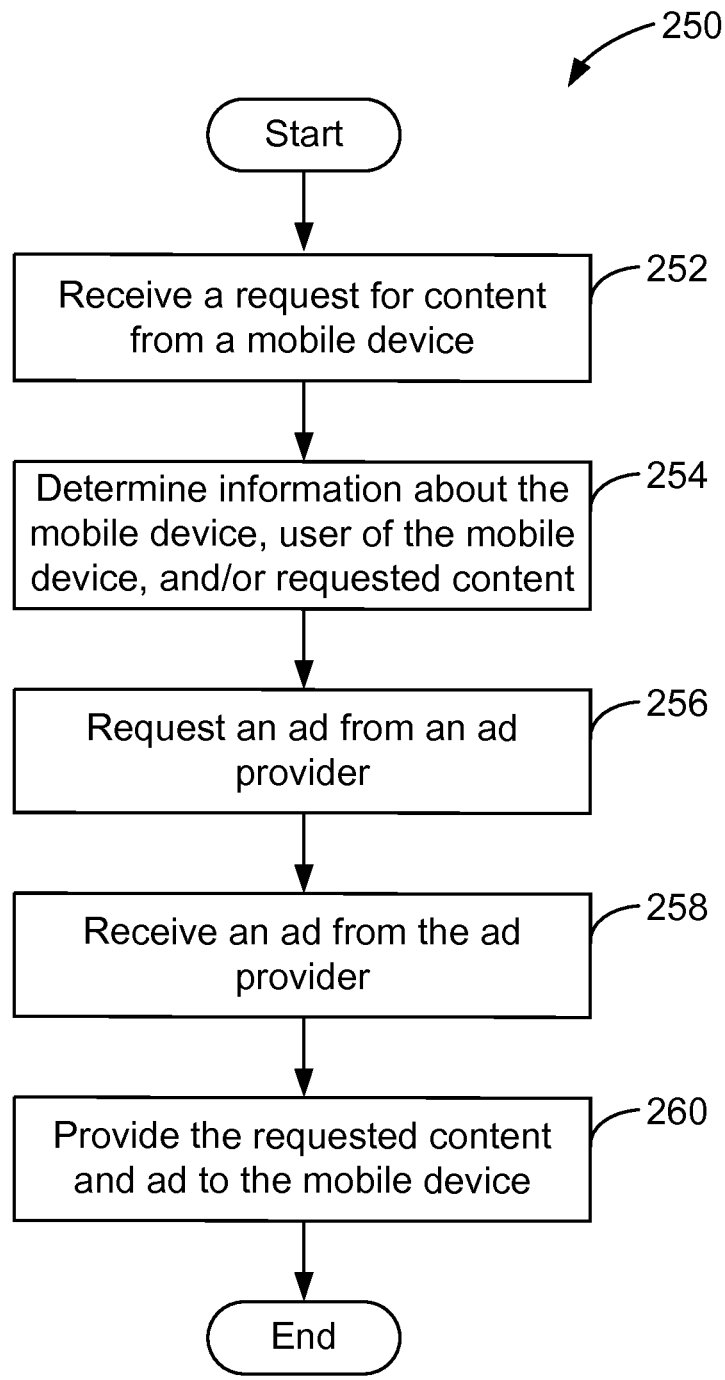
FIG. 4 is a flowchart of an example method for providing an ad with requested content to a mobile communication device.

FIG. 4 illustrates an embodiment of a process 250 for providing content to a mobile communication device 108, including providing an ad with requested content. With respect to FIG. 3, for example, process 250 may be employed by a publisher 104 to respond to a request for content from a mobile communication device 108. For example, a user 107 may open an existing app already installed on mobile communication device 108. The process of opening the existing app may include a communication between publisher 104 and mobile communication device 108 during which supplementary or updated content relating to the existing app is downloaded, including one or more ads, one or more of which are ads for a promoted app. Publisher 104 may include an ad procurement module configured to send requests to mobile ad network(s) 115 for ads for inclusion with, or insertion into, the requested content. In an example, placement of ads (including ads for promoted apps produced by app producers 111) with particular items of content may occur through a bidding process, in which multiple mobile ad networks 115 bid for placement of ads with publishers 104, in accordance with ad placement bidding methods known to those skilled in the art. In another example, specific app producers 111 may have arrangements with publishers 104, such that specific ads will appear in association with specific content such as existing apps. For example, a user, opening a specific existing app, may always be presented with a specific ad, or set of ads corresponding to a predefined type or class, as defined by one or more of publisher 104, and mobile ad network(s) 115.

Process 250 begins with publisher 104 receiving 252 a request for content from mobile device 108. The requested content may correspond to, for example, a web site, web page, or an existing app available or accessible from publisher 104. Information associated with the mobile communication device 108, and/or requested content is determined 254. In some embodiments, the information determined 254 comprises a prescribed standard set of information, if available, such as the IP address of the mobile communication device 108, user agent of the mobile communication device 108, an identifier associated with the requested content, etc. The information that is determined 254 may be for example, from a communication session between mobile communication device 108 and publisher 104, or from the request for content received from mobile communication device 108 at 252. In some embodiments, at least some of the information is determined 254 at a publisher by an ad procurement module. An ad is requested 256 from an ad provider, such as mobile ad network 115. In some embodiments, the ad request 256 includes the information determined 254 so that a more relevant ad can be selected by mobile ad network 115. In some embodiments, at least some of the information determined 254 is provided to the mobile ad network 115 with the ad request via a dedicated API. In some embodiments, the request 256 for an ad is made by an ad procurement module at publisher 104. An ad is received 258 from mobile ad network 115. The requested content, as well as the ad received at 258 are provided 260 to the requesting mobile communication device 108, and process 250 subsequently ends. Although process 250 is described with respect to obtaining from a mobile ad network 115 and providing to a mobile communication device 108 a single ad, process 250 can be similarly employed for obtaining and providing multiple ads.

Figure 5:
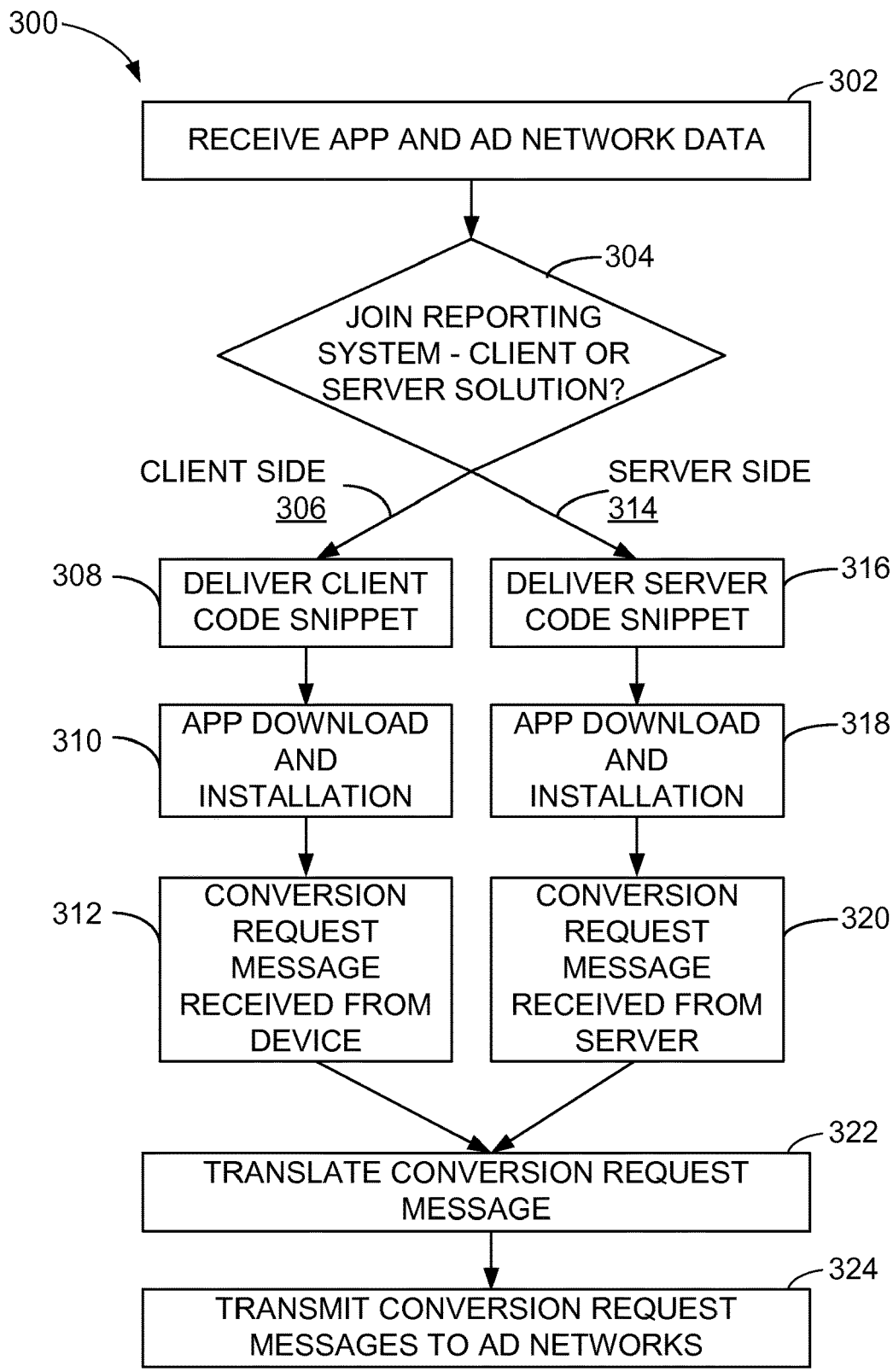
FIG. 5 is a flowchart of an example method implemented using the advertising server system of FIGS. 1 and 2 and environment of FIG. 3, for reporting mobile app qualifying actions and conversions.

FIG. 5 is a flowchart illustrating the steps of an example method 300 used by action reporting system 113 for setting up and performing unified action reporting of qualifying actions and/or conversions relating to ads for mobile apps. Prior to setting up action reporting for any specific app producer 111, system 113 creates an action profile for each mobile ad network 115 that system 113 serves. Each action profile includes a list of action notification parameters ("rules") defined by that specific mobile ad network 115 to enable system 113 to translate an action notification into a format recognizable and executable by that specific mobile ad network 115. In general, each mobile ad network 115 defines its own action notification parameters, which may be different from the action notification parameters used by other mobile ad networks 115. Each action profile also includes specifications for mapping the action notification parameters for that specific mobile ad network 115 to parameters employed by system 113 for use in processing action notifications received as a result of a qualifying action or conversion relating to an app. Action reporting system 113 will periodically contact the various mobile ad networks 115 that system 113 serves to update the profiles that system 113 maintains.

For example, a particular advertising network may have an action notification/action request message of the following form (genericized):

http://networkleads.g.address.net/mads/action/?isu=XXXXX&md5=1&app_id|site_id===YYYYY
  isu: hex-encoded md5 hash of UDID
  app_id: app store id (9-digit integer)
  site_id: mobile ad network 115 site id (15-character hex string), the general configuration of which is recognizable to those skilled in the art. In an embodiment, action reporting system 113 includes a facility for mapping action request message parameters used by system 113 to those used by known mobile advertising networks. System 113 may additionally be configured to provide translations between older and newer versions of action request messages from a single mobile ad network 115.

After an app producer 111 has created an advertising campaign, app producer 111 enables ad action reporting by action reporting system 113. To do this, app producer 111 accesses a user interface ("UI") maintained by action reporting system 113. System 113 receives 302 data from app producer 111 identifying the promoted app, and the mobile ad networks 115 through which the promoted app will be promoted.

System 113 provides 304 a choice to app producer 111, whether to continue to use separate, discrete code snippets for action notifications/action request messages to separate mobile ad networks 115, or to use the unified action reporting through system 113. System 113 additionally provides 304 to app producer 111 a choice of two alternatives, namely a client side solution, and a server side solution.

If app producer 111 selects 306 the client side solution, system 113 delivers 308 to app producer 111 a code snippet for insertion into the promoted app. The client side solution code snippet is configured so that when a promoted app is downloaded, installed, and activated 310 by a mobile communication device 108 user, the code snippet causes an action notification/action request message, incorporating the action notification parameters of system 113, to be sent, from the mobile communication device 108 in which the app is installed, and received 312 by system 113. If app producer 111 selects 314 the server side solution, system 113 delivers 316 to app producer 111 a code snippet that is uploaded into the server used by app producer 111. The server side solution code snippet is configured so that when an app is downloaded, installed and activated 318, and the activation is recorded and reported to a server serving app producer 111, the code snippet causes the server to transmit ("call") the action notification, for receipt 320 by system 113. Regardless of which alternative is selected by app producer 111, the code snippets provided by system 113 cause the action notification to be generated in a first format that is recognized and executable by system 113. The code snippets cause the action notification to include information regarding the promoted app that was downloaded. The code snippets may further cause the action notification to include information that serves as an enabling notification, providing authorization that system 113 may proceed with the further processing of the action notification towards forwarding same to the mobile ad networks 115 previously identified by app producer 111. The code snippets may further cause the action notification to include user device information, as described above, specifically device identifier information.

After receipt (312, 320) of an action notification, system 113 translates 322 the action notification into a second format (and third, fourth, etc., formats as necessary) for receipt and processing by one or more of the respective mobile ad networks 115 that were previously designated by app producer 111 (and identified to system 113) for receipt of action notifications. Following translation 322, system 113 transmits 324 the action notifications to one or more of the previously designated mobile ad networks 115 for further action by the recipient mobile ad networks 115. In addition, in an example embodiment, system 113 maintains records regarding the qualifying actions and/or conversions, so that app producers 111 may, upon accessing the UI maintained by system 113, review data regarding their apps. Accordingly, app producers 111 are relieved of the need to log into the user interface of each mobile ad network 115 that presents their apps in order to review action notification data regarding their apps. Furthermore, because action reporting system 113 relies upon data maintained by action reporting system 113 to identify advertising networks to which action notifications are to be sent, app producers 111 need not revise their apps each time a change in the recipient advertising networks is desired. Instead, app producers 111 merely need to access the UI maintained by action reporting system 113 to add or subtract advertising networks from the group of recipient advertising networks.

As previously described, an app producer 111 may engage more than one mobile ad network 115 to promote a promoted app. Accordingly, app producer 111 provides information regarding the identities of each of the mobile ad networks 115 that are promoting a particular promoted app, for purposes of translating the action notification from the parameters used by system 113 to the various sets of parameters used by the one or more mobile ad networks 115 engaged by app producer 111, and subsequently communicated by app producer 111 to system 113. As described, upon receipt by system 113 of an action notification, either from a device (step 312) or from a server (step 320), system 113 identifies the promoted app that is the subject of the action notification, and identifies each of the mobile ad networks 115 to which a suitably translated action notification is to be sent. System 113 accordingly translates 322 and transmits 324 corresponding action notifications to one or more mobile ad networks 115 previously identified by app producer 111 to system 113 as promoting the promoted app.

In some embodiments, in each instance in which a user "clicks" on an advertisement, data regarding the click ("click data"), such as time, identity of the ad clicked on, and information regarding the device upon which the click was performed (a "device identifier") is recorded. Such information may be recorded in logs maintained by ad networks 115, or another entity, such as system 113. In one embodiment, the device identifier includes information regarding whether the particular user access device 108 is a mobile communication device 108 (and thus performing a conversion through a mobile communication network) or a static computing device (performing a conversion through an online network). In addition, the code snippet inserted by app producer 111 into a promoted app that causes an action notification to be sent when a user performs an action that qualifies as a conversion, such as downloading an app, also may cause the action notification to include additional information. The additional information may include such information as the identity of the promoted app that was downloaded, and a device identifier.

Accordingly, in one embodiment, if, for example, five ad networks 115 are promoting the promoted app, and three of the five ad networks 115 receive ad clicks, following a download of a promoted app, system 113 sends out an action notification to each of the designated ad networks 115, as described above. Each of the networks 115 receiving action notifications may consult click records (maintained by ad networks 115) to ascertain whether a click was received, and proximity in time between a click reported to have occurred through their network, and the reported action, towards determining, of the three mobile ad networks 115 that had received ad clicks, the ad network(s) 115 to which a conversion should be attributed. In the example of three of five ad networks 115 receiving clicks, each ad network 115 may be able to associate a click on an ad on their network as leading to a conversion. In one embodiment, this information is to be provided to app producer 111, which makes a final decision as to which ad network(s) 115 receives credit for a conversion. Depending upon the financial and accounting arrangements established between the ad network(s) 115 and the app producer 111, each of the ad network(s) 115 that received an action notification and recorded a click, may be credited with a conversion (or a share of a conversion). Accordingly, all three ad networks 115 may receive credit for a conversion. Alternatively, app producer 111 may decide that a conversion will be attributed to the ad network 115 reporting the click closest in time to the downloading of the promoted app.

In an alternative embodiment, system 113 is either configured to record click data directly, is provided with direct access to click records maintained by ad networks 115, or acquires click data through some other mechanism sufficient to enable system 113 to function as described. After receipt of an action notification, system 113 accesses relevant click data, and generates a timeline identifying both individual clicks on an ad for a promoted app and the action relating to the promoted app, towards identifying the mobile ad network 115 to which a conversion should be attributed. As described above, while system 113 may have access to click data to enable a timeline to be created, a final decision regarding attribution of the conversion may typically be made by app producer 111. In one embodiment, system 113 sends a notification only to the ad network 115 that received the click closest in time to the download. Alternatively, system 113 may send action notifications to each of ad networks 115 that received clicks associated with the downloaded app. In either embodiment, the ad network(s) 115 that receive the notification(s) will then report the notification(s) to app producer 111 for a final assignment of credit for the conversion.

Implementation of the methods and systems described herein enables app producers to facilitate the recording and reporting of qualifying actions and/or conversions associated with the promoted applications, without having to insert extensive quantities of code into their applications. In addition, the methods and systems described herein enable app producers to change the recipients of action notifications without having to edit their apps.

Figure 6:
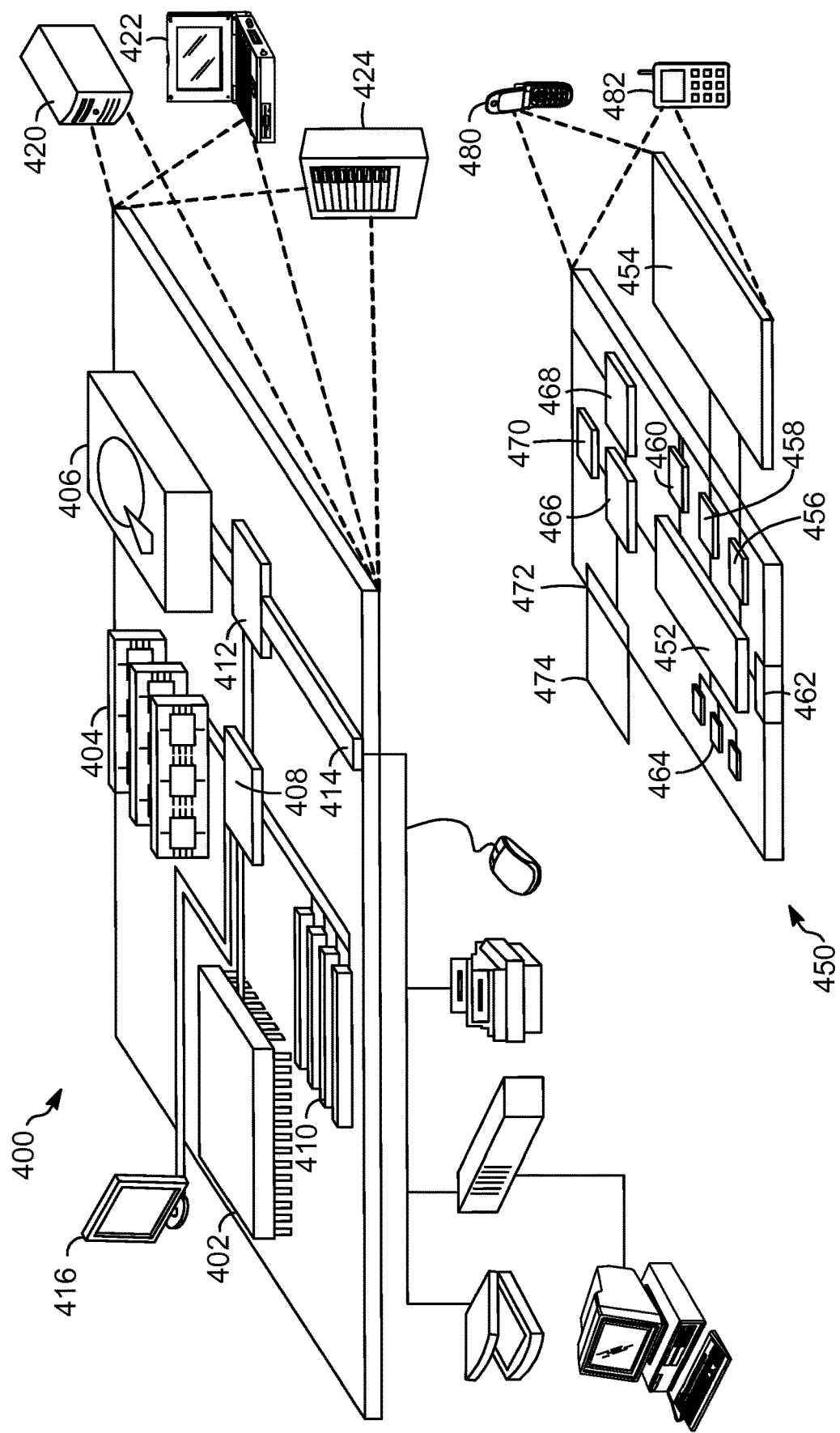
FIG. 6 is a diagram of example computing systems that may be used in the environment shown in FIG. 3 in accordance with one embodiment of the present disclosure.

FIG. 6 is a diagram of an example computing devices/systems 400 and 450 that may be used in the environments shown in FIGS. 1 and 3. More specifically, FIG. 6 shows an example of a generic computing device 400 and a generic mobile computing device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile communication devices, such as personal digital assistants, cellular telephones, smart phones, and other similar computing devices. The components shown here, their connections and relationships, and their functions, are meant to be for the purpose of example only, and are not meant to limit implementations of the disclosures described and/or claimed in this document.

Computing device 400 includes a processor 402, memory 404, a storage device 406, a high-speed interface/controller 408 connecting to memory 404 and high-speed expansion ports 410, and a low-speed interface/controller 412 connecting to low-speed bus 414 and storage device 406. Each of the components 402, 404, 406, 408, 410, and 412, are interconnected using various buses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low-speed controller 412 manages lower bandwidth-intensive operations. Such allocation of functions is for purposes of example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile communication device 108 (not shown), such as computing device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of computing device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to computing device 450 through expansion interface 472, which may include, for example, a SIMM (Single In Line Memory Module) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smart phone 482, personal digital assistant, a computer tablet, or other similar mobile communication device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 400 and 452 are configured to receive and/or retrieve data pertaining to: mobile advertising networks; data regarding mobile advertisers, advertising links or impressions corresponding to those mobile advertisers; and metrics (such as conversions) corresponding to the appearance of those impressions, from various other computing devices connected to computing devices 400 and 452 through a communication network, and store this data within at least one of memory 404, storage device 406, and memory 464. Computing systems 400 and 452 are further configured to manage and organize the data within at least one of memory 404, storage device 406, and memory 464 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement various features may have different names, formats, or protocols. Further, the system may be implemented via a combination of hardware and software, as described, or entirely in hardware elements. Also, the particular division of functionality between the various system components described herein is merely for purposes of example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer-readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A method comprising:
providing, by a first computing device, an action notification code snippet to be included in a promoted application, wherein the action notification code snippet, executed by at least one second computing device, creates a change in configuration of the at least one second computing device to cause an action notification to be sent to the first computing device in a first format consequent to the promoted application being downloaded by the at least one second computing device and receipt of an activation report;
receiving, at the first computing device, an indication that a plurality of mobile advertising networks are advertising the promoted application;
receiving, at the first computing device, click data comprising times of day advertisements associated with the promoted application are clicked on;
receiving, at the first computing device, and storing, in a memory device, rules for translating the action notification from the first format to a respective format for each of the plurality of mobile advertising networks, each respective format for each of the plurality of mobile advertising networks comprising a respective mobile advertising network site ID of the respective mobile advertising network and an application store ID;
receiving, at the first computing device from the at least one second computing device, the action notification in the first format indicating that the promoted application has been downloaded by the at least one second computing device from an online app store, a time of day the promoted application was downloaded from the online app store;
identifying a mobile advertising network of the plurality of mobile advertising networks by:
generating, by the first computing device, a timeline of the click data comprising times of day the advertisements associated with the promoted application are clicked on and the time of day of download, and
selecting, by the first computing device, the mobile advertising network of the plurality of mobile advertising networks, based on a click of the timeline of click data closest in time to the time of day of download;
translating, by the first computing device, the action notification from the first format to the respective format for the identified mobile advertising network using the stored rules for translating the action notification; and
transmitting the translated action notification in the respective format for the identified mobile advertising network from the first computing device to the identified mobile advertising network.

2. The method in accordance with claim 1, wherein the plurality of mobile advertising networks include a first mobile advertising network and a second mobile advertising network, and said method further comprising presenting a user interface enabling a producer of the promoted application to indicate that the first mobile advertising network and the second mobile advertising network are advertising the promoted application.

3. The method in accordance with claim 1, wherein the plurality of mobile advertising networks include a first mobile advertising network and a second mobile advertising network, and said method further comprising storing in the memory device a first action profile associated with the first mobile advertising network and a second action profile associated with the second mobile advertising network, wherein each of the action profiles includes one or more specifications for mapping elements of the action notification from the first format to the corresponding target format.

4. The method in accordance with claim 1, wherein the plurality of mobile advertising networks include a first mobile advertising network and a second mobile advertising network, and said method further comprising:
receiving, at the first computing device, a second indication that a third mobile advertising network is advertising the promoted application;
storing, in the memory device, rules for translating the action notification from the first format to a third target format, wherein the third target format is associated with the third mobile advertising network;
in response to receiving the action notification, retrieving, by the first computing device, data identifying the first, second and third mobile advertising networks based, at least in part, on the received first and second indications and the action notification;

translating, by the first computing device, the action notification from the first format to each target format for the first, second and third mobile advertising networks; and transmitting the action notification from the first computing device to the first, second and third mobile advertising networks in the target format corresponding to each of those mobile advertising networks.

5. The method in accordance with claim 1, wherein providing an action notification code snippet further comprises transmitting, from the first computing device, to a third computing device associated with a producer of the promoted application, the action notification code snippet for inclusion in the promoted application prior to downloading by the at least one second computing device, wherein the action notification code snippet, when executed, causes the at least one second computing device to transmit the action notification in the first format to the first computing device.

6. The method in accordance with claim 1, wherein said method comprises:

receiving, at the first computing device, an enable indication, wherein the enable indication indicates that the first computing device has authorization to transmit the action notification to the identified mobile advertising network; and transmitting the translated action notification in the respective format for the identified mobile advertising network from the first computing device to the identified mobile advertising network based on the authorization to transmit the action notification to the identified mobile advertising network.

7. The method in accordance with claim 1, wherein said method comprises receiving, by the first computing device, the action notification from a server computing device associated with a producer of the promoted application.

8. The method in accordance with claim 1, wherein the action notification is received by the first computing device from the second computing device.

9. The method in accordance with claim 1, wherein the action notification is received by the first computing device from a server associated with a producer of the promoted application, and wherein the method further comprises:

transmitting the action notification from the first computing device to each of the plurality of mobile advertising networks in the corresponding target format; and determining two or more of the plurality of mobile advertising networks should receive conversion credit for the downloading of the promoted application by the at least one second computing device based upon the timeline of click data.

10. Non-transitory computer-readable media having computer-executable instructions embodied thereon, wherein, when executed by at least one processor associated with a first computing device and a memory device, the computer-executable instructions cause the processor to:

provide an action notification code snippet to be included in a promoted application, wherein the action notification code snippet, executed by at least one second computing device, creates a change in configuration of the at least one second computing device to cause an action notification to be sent to the first computing device in a first format consequent to the promoted application being downloaded by the at least one second computing device and receipt of an activation report;

receive an indication that a plurality of mobile advertising networks are advertising the promoted application;

receive click data comprising times of day advertisements associated with the promoted application are clicked on;

receive and store rules for translating the action notification from the first format to a respective format for each of the plurality of mobile advertising networks, each respective format for each of the plurality of mobile advertising networks comprising a respective mobile advertising network site ID of the respective mobile advertising network and an application store ID;

receive, from the at least one second computing device, the action notification in the first format indicating that the promoted application has been downloaded by the at least one second computing device, a time of day the promoted application was downloaded;

identify a mobile advertising network of the plurality of mobile advertising networks by:

generating a timeline of the click data comprising times of day the advertisements associated with the promoted application are clicked on and the time of day of download, and selecting the mobile advertising network of the plurality of mobile advertising networks, based on a click of the timeline of click data closest in time to the time of day of download;

translate the action notification from the first format to the respective format for the identified mobile advertising network using the stored rules for translating the action notification; and transmit the translated action notification in the respective format for the identified mobile advertising network from the first computing device to the identified mobile advertising network.

11. The non-transitory computer-readable media in accordance with claim 10, wherein the first computing device is in communication with a user interface, and wherein the plurality of mobile advertising networks include a first mobile advertising network and a second mobile advertising network, and wherein the computer-executable instructions cause the processor to display the user interface to a producer of the promoted application, and receive data input indicating that the first mobile advertising network and the second mobile advertising network are advertising the promoted application.

12. The non-transitory computer-readable media in accordance with claim 10, wherein the plurality of mobile advertising networks include a first mobile advertising network and a second mobile advertising network, and wherein the computer-executable instructions cause the processor to store in the memory device a first action profile associated with the first mobile advertising network and a second action profile associated with the second mobile advertising network, wherein each of the action profiles includes one or more specifications for mapping elements of the action notification from the first format to the corresponding target format.

13. The non-transitory computer-readable media in accordance with claim 10, wherein the plurality of mobile advertising networks include a first mobile advertising network and a second mobile advertising network, and wherein the computer-executable instructions cause the processor to:

receive a second indication that a third mobile advertising network is advertising the promoted application;

store rules for translating the action notification from the first format to a third target format, wherein the third target format is associated with the third mobile advertising network;

in response to receiving the action notification, retrieve data identifying the first, second and third mobile advertising networks based, at least in part, on the received first and second indications and the action notification;

translate the action notification from the first format to each target format for the first, second and third; and transmit the action notification to the first, second and third mobile advertising networks in the target format corresponding to each of those mobile advertising networks.

14. The non-transitory computer-readable media in accordance with claim 13, wherein the second mobile advertising network has a target format distinct from the target format of the first mobile advertising network.

15. The non-transitory computer-readable media in accordance with claim 10, wherein the computer-executable instructions cause the processor to transmit to a third computing device associated with a producer of the promoted application prior to downloading by the at least one second computing device, the action notification code snippet for inclusion in the promoted application, wherein the action notification code snippet, when executed, causes the at least one second computing device to transmit the action notification in the first format to the first computing device.

16. The non-transitory computer-readable media in accordance with claim 10, wherein the computer-executable instructions cause the processor to:

receive an enable indication, wherein the enable indication indicates that the first computing device has authorization to transmit the action notification to the identified mobile advertising network; and transmit the translated action notification in the respective format for the identified mobile advertising network from the first computing device to the identified mobile advertising network based on the authorization to transmit the action notification to the identified mobile advertising network.

17. The non-transitory computer-readable media in accordance with claim 10, wherein the computer-executable instructions cause the processor to receive the action notification from a server computing device associated with a producer of the promoted application.

18. The computer-executable storage media in accordance with claim 10, wherein the action notification is received by the first computing device from the second computing device.

19. The non-transitory computer-readable media in accordance with claim 10, wherein the action notification is received by the first computing device from a server associated with a producer of the promoted application, and wherein the computer-executable instructions cause the processor to:

transmit the action notification to each of the plurality of mobile advertising networks in the corresponding target format; and determine two or more of the plurality of mobile advertising networks should receive conversion credit for the downloading of the promoted application by the at least one second computing device based upon the timeline of click data.

20. A computer system comprising:
a first computing device including
a processor; and
a computer-readable storage device having encoded thereon computer-executable instructions that are executable by the processor to perform functions comprising:
providing an action notification code snippet to be included in a promoted application, wherein the action notification code snippet, executed by at least one second computing device, creates a change in configuration of the at least one second computing device to cause an action notification to be sent to the first computing device in a first format consequent to the promoted application being downloaded by the at least one second computing device and receipt of an activation report;
receiving an indication that a plurality of mobile advertising networks are advertising the promoted application;
receiving click data comprising times of day advertisements associated with the promoted application are clicked on;
receiving rules for translating the action notification from the first format to a respective format for each of the plurality of mobile advertising networks, each respective format for each of the plurality of mobile advertising networks comprising a respective mobile advertising network site ID of the respective mobile advertising network and an application store ID;
receiving the action notification, from the at least one second computing device, in the first format indicating that the promoted application has been downloaded by the at least one second computing device, a time of day the promoted application was downloaded;
identifying a mobile advertising network of the plurality of mobile advertising networks by:
generating a timeline of the click data comprising times of day the advertisements associated with the promoted application are clicked on and the time of day of download, and
selecting, the mobile advertising network of the plurality of mobile advertising networks, based on a click of the timeline of click data closest in time to the time of day of download;
translating the action notification from the first format to the respective format for the identified mobile advertising network using the stored rules for translating the action notification; and
transmitting the translated action notification in the respective format for the identified mobile advertising network from the first computing device to the identified mobile advertising network.

21. The computer system in accordance with claim 20, wherein the first computing device is in communication with a user interface, and wherein the plurality of mobile advertising networks include a first mobile advertising network and a second mobile advertising network, and wherein the computer-executable instructions cause the processor to display the user interface to a producer of the promoted application, and receive data input indicating that the first mobile advertising network and the second mobile advertising network are advertising the promoted application.

22. The computer system in accordance with claim 20, wherein the plurality of mobile advertising networks include a first mobile advertising network and a second mobile advertising network, and wherein the computer-executable instructions cause the processor to store in the memory device a first action profile associated with the first mobile advertising network and a second action profile associated with the second mobile advertising network, wherein each of the action profiles includes one or more specifications for mapping elements of the action notification from the first format to the corresponding target format.

23. The computer system in accordance with claim 20, wherein the plurality of mobile advertising networks include a first mobile advertising network and a second mobile advertising network, and wherein the computer-executable instructions cause the processor to:
receive a second indication that a third mobile advertising network is advertising the promoted application;
store rules for translating the action notification from the first format to a third target format, wherein the third target format is associated with the third mobile advertising network;
in response to receiving the action notification, retrieve data identifying the first, second and third mobile advertising networks based, at least in part, on the received first and second indications and the action notification;
translate the action notification from the first format to each target format for the first, second and third mobile advertising networks; and
transmit the action notification to the first, second and third mobile advertising networks in the target format corresponding to each of those mobile advertising networks.

24. The computer system in accordance with claim 23, wherein the second mobile advertising network has a target format distinct from the target format of the first mobile advertising network.

25. The computer system in accordance with claim 20, wherein the computer-executable instructions cause the processor to transmit, from the first computing device, to a third computing device associated with a producer of the promoted application prior to downloading by the at least one second computing device, the action notification code snippet for inclusion in the promoted application, wherein the action notification code snippet, when executed, causes the at least one second computing device to transmit the action notification in the first format to the first computing device.

26. The computer system in accordance with claim 20, wherein the computer-executable instructions cause the processor to:
receive, at the first computing device, an enable indication, wherein the enable indication indicates that the first computing device has authorization to transmit the action notification to the selected mobile advertising network; and
transmit the translated action notification in the respective format for the selected mobile advertising network from the first computing device to the selected mobile advertising network based on the authorization to transmit the action notification to the selected mobile advertising network.

27. The computer system in accordance with claim 20, wherein the computer-executable instructions cause the processor to receive, by the first computing device, the action notification from a server computing device associated with a producer of the promoted application.

28. The computer-executable storage media in accordance with claim 20, wherein the action notification is received by the first computing device from the second computing device.

29. The computer-executable storage media in accordance with claim 20, wherein the action notification is received by the first computing device from a server associated with a producer of the promoted application, and wherein the computer-executable instructions cause the processor to:
transmit the action notification to each of the plurality of mobile advertising networks in the corresponding target format; and
determine two or more of the plurality of mobile advertising networks should receive conversion credit for the downloading of the promoted application by the at least one second computing device based upon the timeline of click data.

\* \* \* \* \*